(12) United States Patent
Cai et al.

(10) Patent No.: US 7,769,402 B2
(45) Date of Patent: Aug. 3, 2010

(54) ADAPTIVE BEARER CONFIGURATION FOR BROADCAST/MULTICAST SERVICE USING RECEIVED RESPONSE INFORMATION

(75) Inventors: Zhijun Cai, Euless, TX (US); Mansoor Ahmed, Fort Worth, TX (US); Robert M. Harrison, Grapevine, TX (US)

(73) Assignee: Motorola, Inc., Schaumburg, IL (US)

( * ) Notice: Subject to any disclaimer, the term of this patent is extended or adjusted under 35 U.S.C. 154(b) by 955 days.

(21) Appl. No.: 11/286,799

(22) Filed: Nov. 23, 2005

(65) Prior Publication Data

US 2007/0117518 A1    May 24, 2007

(51) Int. Cl.
*H04B 7/00* (2006.01)
*H04B 17/00* (2006.01)
*H04B 1/00* (2006.01)

(52) U.S. Cl. .................. 455/517; 455/522; 455/69; 455/67.13; 455/102

(58) Field of Classification Search .............. 455/517, 455/522, 69, 67.13, 102
See application file for complete search history.

(56) References Cited

U.S. PATENT DOCUMENTS

| | | | |
|---|---|---|---|
| 2003/0119452 A1* | 6/2003 | Kim et al. | 455/69 |
| 2003/0228865 A1* | 12/2003 | Terry | 455/422.1 |
| 2004/0092289 A1* | 5/2004 | Yamada et al. | 455/560 |
| 2005/0070277 A1* | 3/2005 | Hu | 455/432.3 |
| 2005/0085254 A1* | 4/2005 | Chuah et al. | 455/522 |
| 2005/0195760 A1* | 9/2005 | Lee et al. | 370/312 |
| 2005/0272456 A1* | 12/2005 | Yoshii et al. | 455/522 |
| 2007/0165551 A1* | 7/2007 | Proctor et al. | 370/312 |

OTHER PUBLICATIONS

"Intro. of the Multimedia Broadcast Multicast Service (MBMS) in the Radio Access Network (RAN)," 3rd. Gen. Partnership Proj. (3GPP); Tech. Spec. Group Radio Access Network; Stage 2 (Rel. 6), 3GPP TS 25.346 v6.7.0 (Dec. 2005).

"Multimedia Broadcast/Multicast Service (MBMS); Architecture and functional description," 3rd. Gen. Partnership Proj.; Tech. Spec. Group Services and Systems Aspects; (Rel. 6), 3GPP TS 23.246 v6.9.0 (Dec. 2005).

Philips, "Some considerations on the L2 design of the RB carrying MBMS," 3GPP Tech. Spec. Change Request TSG R2-37(03)2146 (Aug. 2003).

* cited by examiner

*Primary Examiner*—Matthew D Anderson
*Assistant Examiner*—Wen W Huang
(74) *Attorney, Agent, or Firm*—Vedder Price P.C.

(57) ABSTRACT

A method and apparatus for providing adaptive bearer configuration for MBMS delivery is disclosed. A first aspect of the present disclosure is a method of operating a wireless infrastructure entity (103) wherein a plurality of common radio resources (303) are allocated for receiving combined responses from a plurality of mobile stations (109). A request message, similar to a request for counting, is broadcast to all mobile stations (109) within a coverage area (105) and may indicate a range, for example a signal-to-noise-and-interference ratio range. Mobile stations (109) responding to the request, use specific resources (303) corresponding to respective range values. The infrastructure (103) may use the received information to determine a modulation and coding scheme for PTM broadcast. The total number of responses to the request message may be limited by providing a probability factor within the request message.

20 Claims, 7 Drawing Sheets

ADAPTIVE BEARER CONFIGURATION FOR BROADCAST/MULTICAST SERVICE USING RECEIVED RESPONSE INFORMATION

FIELD OF THE DISCLOSURE

The present disclosure relates generally to communication networks providing multimedia broadcast multicast service, and more particularly to methods and apparatus for providing and receiving multimedia broadcast multicast services within a communication network coverage area.

BACKGROUND OF THE DISCLOSURE

The localized multicast approach reduces expended network resources by limiting transmissions to a geographic area defined by the radio coverage area of a base transceiver station or even smaller areas as defined by antenna coverage sectors of the base transceiver station. Multicast services in general are described in various standards such as the Third Generation Partnership Project (3GPP), Universal Mobile Telephone System (UMTS) standards.

Localized multicast is likewise generally described in the UMTS standards. The UMTS standards, Release 6, define a counting procedure for Multimedia Broadcast, Multicast Service (MBMS) whereby the network learns the status of mobile devices in each cell and configures Radio Bearers (RBs) based upon the learned status information.

Two modes of operation are employed in the standards, namely, Point-to-Point (PTP) and Point-to-Multipoint (PTM). Under counting procedures, coverage areas having less than a preset number of users, employ PTP operation which requires setup of RBs individually per user. Conversely, coverage areas having at least the preset number of users will employ PTM for MBMS delivery wherein individual RBs are not required.

These known procedures for MBMS delivery, more specifically, the procedures for selecting/switching between PTP and PTM modes have several disadvantages. First, employing and switching between two transmission modes complicates network procedures such as, but not limited to, Radio Link Control (RLC) buffer management, RB switching, etc.

Second, using PTP fails to take advantage of the performance gain that may be achieved through using macro-diversity with PTM.

Third, PTP/PTM switching requires a certain degree of counting accuracy which can cause undesired network loading on both the uplink access channel and the Radio Network Controller (RNC).

Fourth, existing counting methods do not support extracting other information from mobile stations that could be useful for determining, for example, a modulation and coding scheme to employ for MBMS delivery to a given coverage area.

DETAILED DESCRIPTION OF THE PREFERRED EMBODIMENTS

Methods and apparatuses for providing adaptive bearer configuration for MBMS delivery are provided herein.

A first aspect of the present disclosure is a method of operating a wireless infrastructure entity wherein a common radio resource is allocated for receiving a response from at least one mobile station. A request message, similar to a request for counting, is broadcast to all mobile stations within a coverage area. If at least one mobile station responds to the request, PTM transmission mode will be used for MBMS delivery within the given coverage area. If more than one mobile station within the coverage area responds to the request, then in accordance with an embodiment, the responses will be over the common radio resource. The total number of responses to the request message may be limited, in some embodiments, by providing a probability factor within the request message.

Further in accordance with the first aspect, the broadcast request message may also include a specified signal-to-noise-and-interference ratio (SINR) range. In a corresponding embodiment, mobile stations having the specified SINR will respond to the broadcast request, provided that such mobile stations also meet any other specified parameter requirements.

A second aspect of the present disclosure, involves determining a modulation and coding scheme to employ for PTM mode and using the modulation and coding scheme to transmit the MBMS data to mobiles.

A third aspect of the present disclosure is a base station, which may be for example an Enhanced Universal Terrestrial Radio Access (E-UTRA) Edge Node (EN), within an Enhanced Universal Terrestrial Radio Access Network (E-UTRAN). In an embodiment, a base station has a transceiver and controller configured to allocate a common frequency and time based resource for receiving multiple responses to broadcast request messages. The base station determines whether at least one mobile station is within a coverage area of the transceiver and if so, transmits in PTM mode.

The multiple responses from mobile stations responding to the broadcast request are received in a combined manner in accordance with some embodiments.

Further in some embodiments related to the third aspect of the present disclosure, the base station may select a modulation and coding scheme for transmitting in PTM mode based upon at least one mobile station response to the broadcast request message.

A fourth aspect of the present disclosure is a mobile station which may in some embodiments be a UMTS User Equipment (UE) or an E-UTRA UE. The mobile station comprises a transceiver and a controller which may utilize various modulation and coding schemes for transmitting and receiving. The mobile station measures SINR values for received signals and may indicate this information back to a base station in some embodiments. Alternatively, the mobile station may independently use the measured SINR value or values to select an appropriate modulation and coding scheme for receiving PTM transmission, and indicate the desired scheme to the base station. In one embodiment, this indication by the mobile may be implied by the selection of one of a plurality of common radio resources over which the mobile stations may respond to the request message broadcast by the network.

Figure 1:
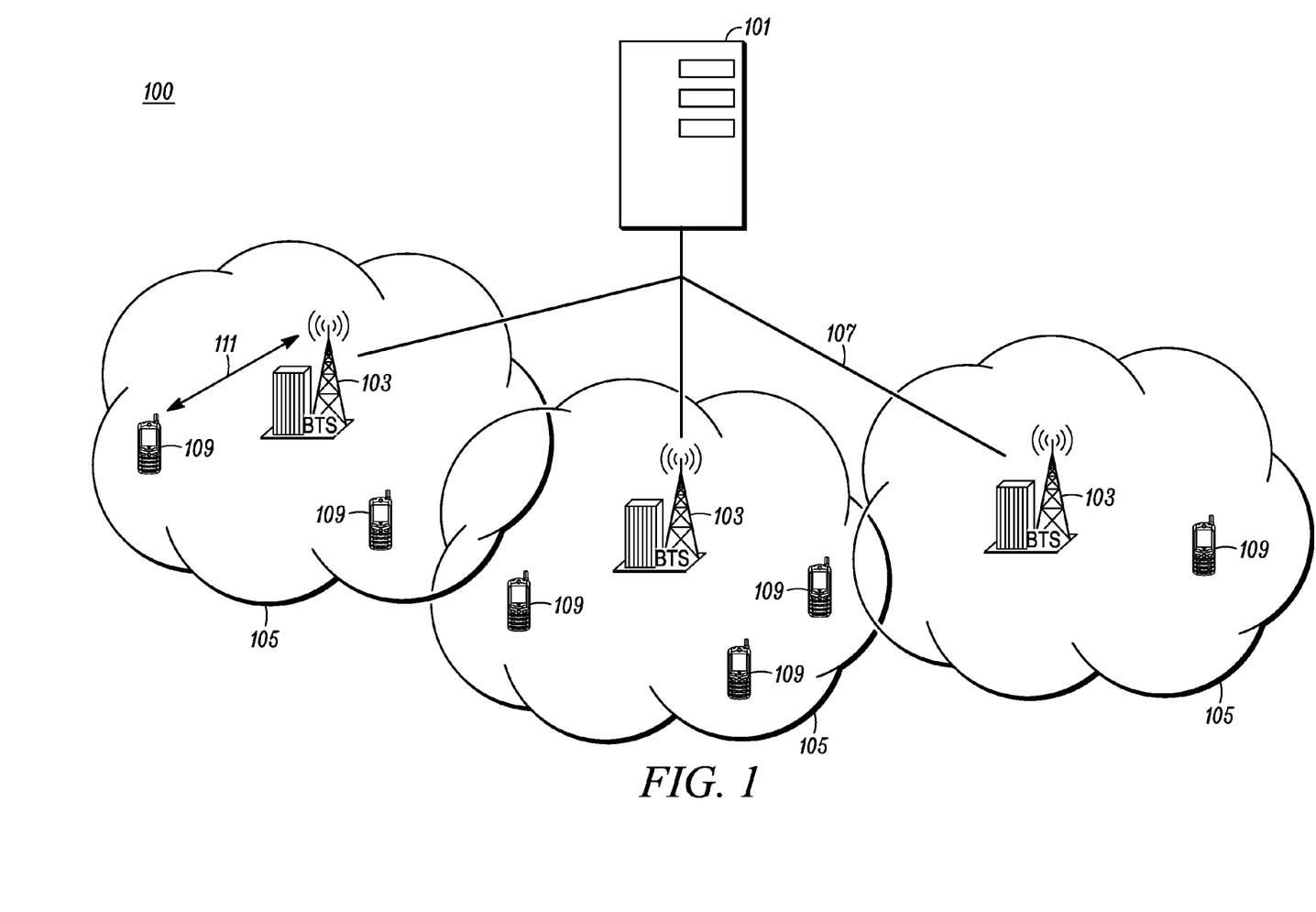
FIG. 1 is a diagram illustrating an exemplary communications network having various coverage areas with mobile stations located therein.

Turning now to the drawings wherein like numerals represent like components, FIG. 1 illustrates a communications network 100, with various base stations 103, each base station 103 having a corresponding coverage area 105. In general, base station coverage areas may overlap and, in general, form an overall network coverage area. An MBMS coverage area may comprise a number of base station coverage areas 105, which may form a contiguous radio coverage area. However, it is not required to have contiguous MBMS coverage and therefore the MBMS coverage area may alternatively be distributed throughout an overall network coverage area. Furthermore, each coverage area may have a number of mobile stations or UEs 109. A number of bases stations 103 will be connected to a base station controller 101 via backhaul connections 107. The base station controller and base stations form a Radio Access Network (RAN). The overall network may comprise any number of base station controllers, each controlling a number of base stations. Note that the base station controller 101 may alternatively be implemented as a distributed function among the base stations.

The base stations 103 may communicate with the mobile stations 109 via any number of standard air interfaces and using any number of modulation and coding schemes. For example, E-UMTS or CDMA2000 may be employed. Further, E-UMTS may employ Orthogonal Frequency Division Multiplexing (OFDM) and CDMA2000 may employ orthogonal spreading codes such as the Walsh codes. Semi-orthogonal spreading codes may also be utilized to achieve additional channelization over the air interface.

Figure 2:
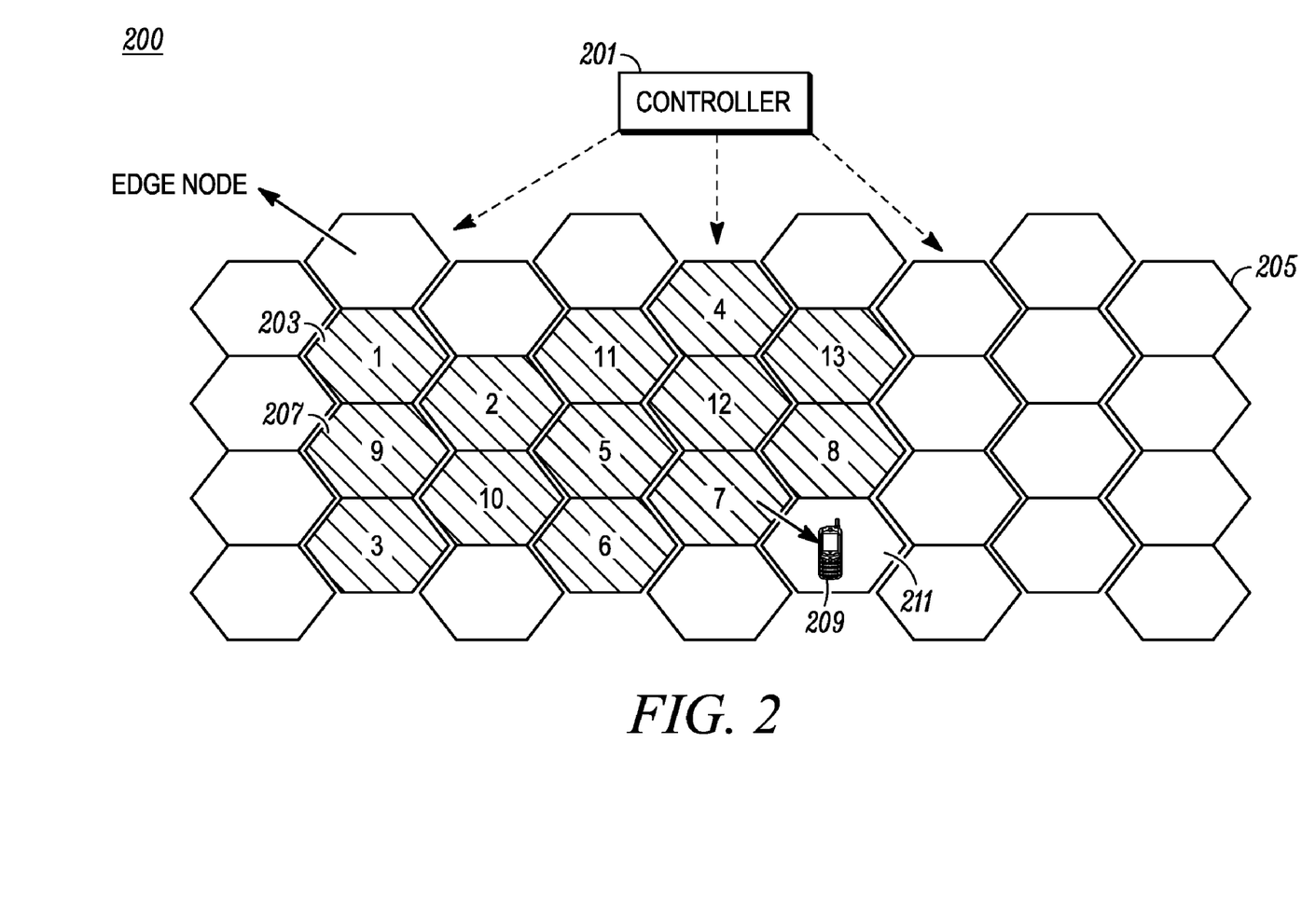
FIG. 2 is a diagram representing coverage areas in a simplified manner, wherein some coverage areas, or cells, have a number of users.

FIG. 2 represents the coverage areas 105 of FIG. 1 in a simplified manner as hexagonal areas. Each hexagonal area corresponds to a base station or Edge Node (EN) coverage area, and is alternatively referred to as a cell, such as cells 203, 205 and 207. Also, the network 200 illustrated in FIG. 2 will have a number of base station controllers such as base station controller 201 which may be connected to any number of cells.

Typically, a base station controller will control a number of cells over a contiguous radio coverage area although such a schema is not required. Returning to FIG. 2, each cell may have a number of mobile devices within, for example cell 203 has 1 mobile device, cell 207 has 9 mobile devices, and cell 205 has none.

In FIG. 2, assuming that the number of mobile stations shown indicated in some cells are configured to receive an MBMS service ("subscribed to MBMS"), then each mobile station will receive the MBMS data via PTM from its respective cell over a PTM Radio Bearer (RB). The cells that have no mobile devices subscribed to MBMS, for example cell 205, may not establish a PTM RB.

It is to be understood that cells that do not have mobile stations subscribed to MBMS may still have mobile stations present although such mobile stations are not indicated in FIG. 2. Further, the cells shown in FIG. 2 are idealized. Radio coverage areas are more realistically represented by FIG. 1 which shows that radio coverage areas or cells 105 may overlap. Therefore, mobile stations are capable of communicating with several cells having overlapping areas; However, the idealized cell areas of FIG. 2 illustrates the concept of using the "best server," that is, the cell providing the mobile station with the best coverage at that particular time. The best server may be determined by any number of parameters such as signal-to-noise-and-interference ratio (SINR), bit error rate (BER), frame erasure rate (FER), or any other indicator, combination of indicators, or an indicator output from an algorithm using any one or more of the indicators as an input, all being understood by one of ordinary skill in the art.

Therefore, returning to FIG. 2, a mobile station 209 may leave a cell having a PTM RB and move to a cell 211 which previously did not have a PTM RB established. In this case, the mobile station 209 may initiate PTM setup on the new best server cell 211.

Figure 3:
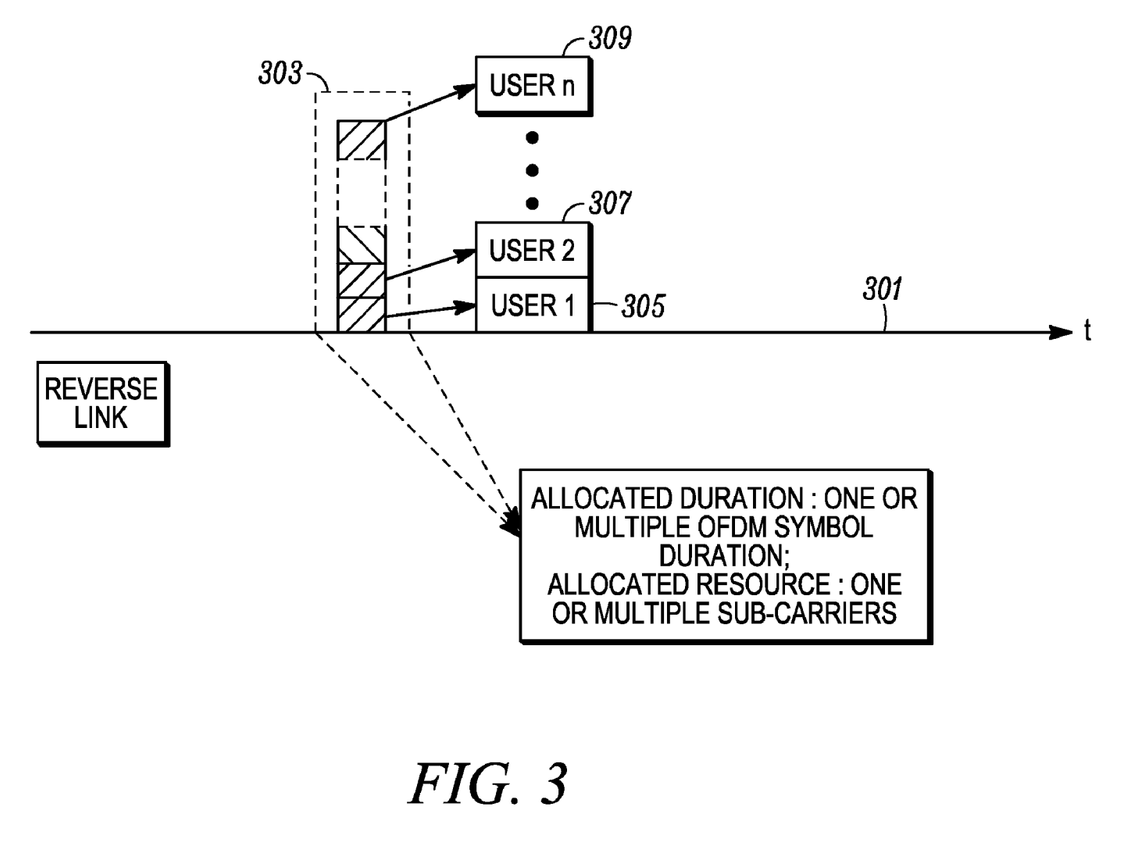
FIG. 3 is a time scale diagram showing multiple users on a single frequency and time based resource.

FIG. 3 is a time scale diagram showing the common resource allocated for receiving responses from mobile stations within a cell. The horizontal axis 301 is a scale of increasing time with time duration 303 being a time duration on the reverse link, or uplink which is the communication path from a mobile station to a base station. A number of resources may be allocated for receiving responses for various purposes such as improving reliability of reception. Additionally, specific resources may be allocated for receiving specific indication information from mobile stations responding via the particular specific resource. For example, mobile stations may indicate their respective SINR values, or portion of a specified SINR range, by responding via a particular resource.

In an embodiment, a "0-1" counting is applied. More specifically, the base station need not differentiate between users. The base station only needs to determine whether any mobile stations are within the cell that are subscribed to MBMS and, in some embodiments also whether the mobile stations have not previously received the offered MBMS transmission. For example, a counting request from the base station may comprise a service identifier corresponding to the particular provider MBMS, and also a session identifier wherein multiple sessions may be available. If a mobile station is subscribed to MBMS as determined by the service identifier, but has not received the current session as determined by the session identifier, the mobile station may indicate that it wants to receive the offered session. Therefore, returning to FIG. 3, the base station allocated a frequency and time based resource 303, for example one or multiple OFDM sub-carrier symbol durations. The base station thereafter, transmitted a broadcast message requesting a counting of mobile stations that want to receive the MBMS transmission.

As illustrated in FIG. 3, a number of mobile stations, from user one 305, through an $n^{th}$ user 309 may respond during the symbol duration. In accordance with some embodiments, the mobile stations employ an ON/OFF keying scheme and transmit the same symbol over the same resource 303. The base station, in accordance with some embodiments, will receive the responses as a combination of identical symbols from the mobile stations joining in the response.

If the base station receives the symbol over the allocated resource 303 during the allocated time duration the base station may decide that PTM transmission is required. Otherwise, if no symbol is detected by the base station, no PTM RB is established in that particular cell.

One potential difficulty can arise due to difficult radio propagation conditions such as flat Rayleigh fading in the radio environment of any particular cell. That is, when the number of mobile stations responding is very small, reception performance may be very poor such that the base station cannot detect the symbol. Therefore, in some embodiments, repetition is employed to provide diversity and may be accomplished in both the frequency domain and the time domain.

For example, in a system utilizing OFDM, two sub-carriers and two symbol durations may be allocated such that four repetitions of the symbols transmitted from the mobile stations will occur. Significant diversity gain as well as power gain may be achieved by employing such simple repetition as in accordance with some embodiments.

Figure 4:
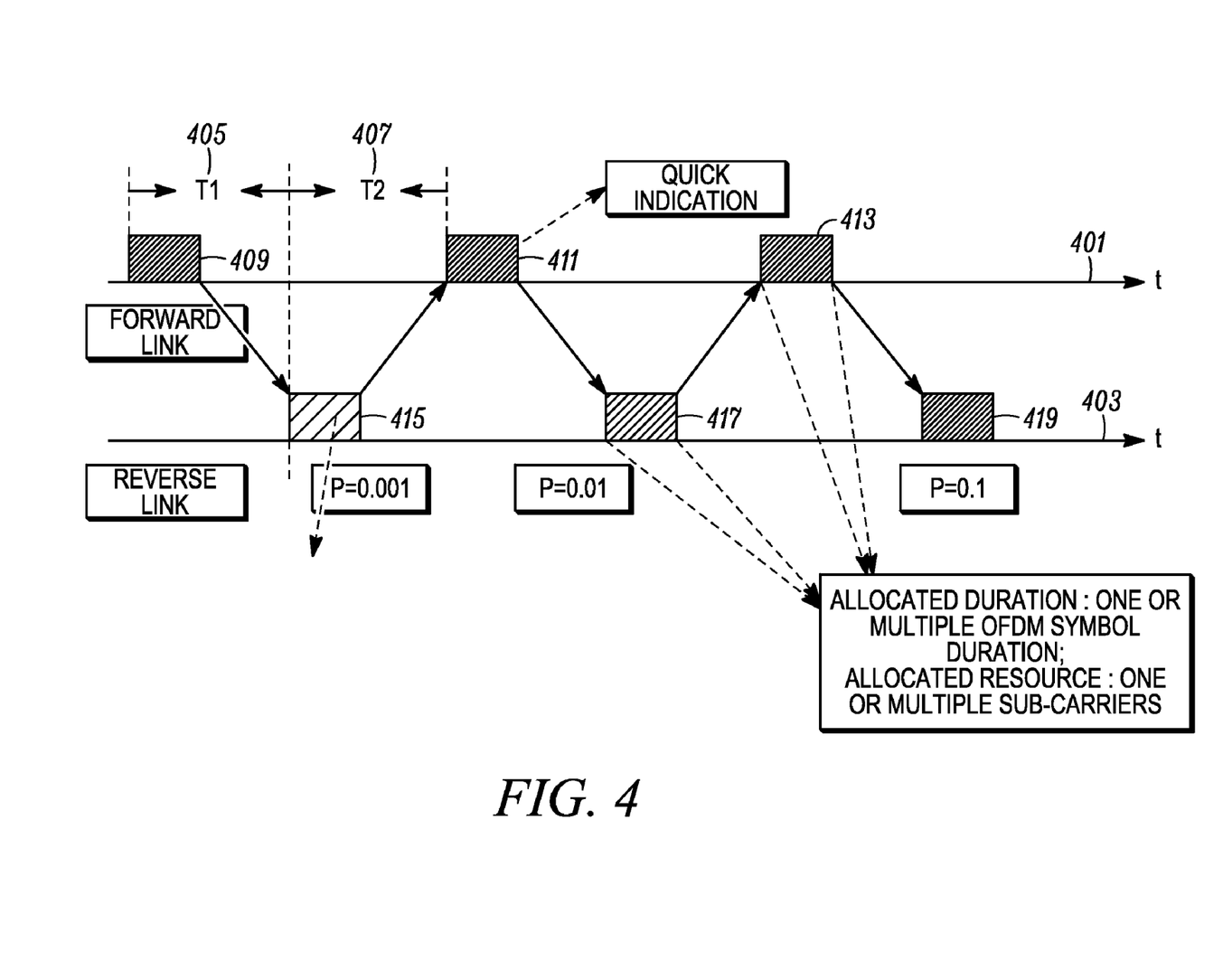
FIG. 4 is a time scale diagram showing messages on the forward and reverse links.

Another potential difficulty may arise when the number of mobile stations responding is very large, for example 1000 or greater. In this case, interference with other nearby cells may occur. Therefore, in some embodiments, a multi-step counting procedure is employed with a Quick Indication (QI). This solution is illustrated by FIG. 4. FIG. 4 is a time scale diagram showing messages on the forward link (downlink) 401 and on the reverse link (uplink) 403.

After a base station indicates a counting has started; by for example, broadcasting a request message, a default initial probability "P" is used to regulate the number of mobile stations responding to the request.

Therefore, if 1000 mobile stations would have responded, and P=0.01, then the average number of mobile stations transmitting counting responses would be 10 as a result of the probability test. If the base station does not detect a response, another request message may be broadcast with a higher probability factor. For example, if initially P=0.01, then the next counting request will indicate P=0.1. Alternatively, the mobile station will monitor for additional counting requests. If another request is received, the mobile stations will update P by a factor of 10 and repeat the probability test prior to responding.

If the base station detects a counting response the counting stops and no further request messages are transmitted. Therefore, in FIG. 4, and also with respect to FIG. 1, a base station controller 101 will send the Temporary Mobile Group Identity (TMGI) and a session ID to all base stations (Edge Nodes) 103 within its control area. Each base station 103 will then broadcast the notification message QI 409, during time interval T1 405 and allocate a resource for response as time interval T2 407. The notification message QI 409 will indicate at least the TMGI, session ID, initial probability factor P, and the allocated response resource on the reverse link. The QI can be one of a plurality of physical layer signals, through which the TMGI, session ID, initial probability factor P, and the allocated response resource on the reverse link, are changed or set in a manner known to the mobile station. Alternatively, one or all resources may be predefined in which case the resource allocation information need not be contained in the notification message QI 409. Furthermore, the QI can be used to indicate that the mobile stations should cease transmitting counting responses.

After receiving the first QI 409, the mobile stations will run a probability test using the initial probability factor, P, and determine whether to join in the counting response. If a mobile station determines it should respond, it will transmit using ON/OFF Keying during the allocated response time interval T2 407. The base station 103 may thereafter receive at least one response, or a combined response 415 during the time interval T2 407.

If the base station 103 does not receive a response, it transmits a second QI 411 after the first response time interval 407. The second QI 411 may be much simplified from the initial QI 409. The mobile stations 109 monitor for the next QI 411. If no additional QIs are detected by the mobile station, then the mobile station may assume that the counting process is completed. If another QI is detected, for example QI 411, then the mobile station will update the probability factor to N times the initial probability factor, for example if N=10, $P_{next}=10 \times P_{initial}$, and run the probability test again to determine whether to join the counting response. This procedure will repeat as shown in FIG. 4, until the base station 103 detects at least one response. For example, in FIG. 4 a third QI 413 may be transmitted and the mobile stations may update P to P=0.1, run the probability test, and if appropriate, transmit the response 419. Note that if P=1, and no response has been received, then the counting procedure is completed as it may be assumed that no mobile station is present within the cell coverage area.

Figure 5:
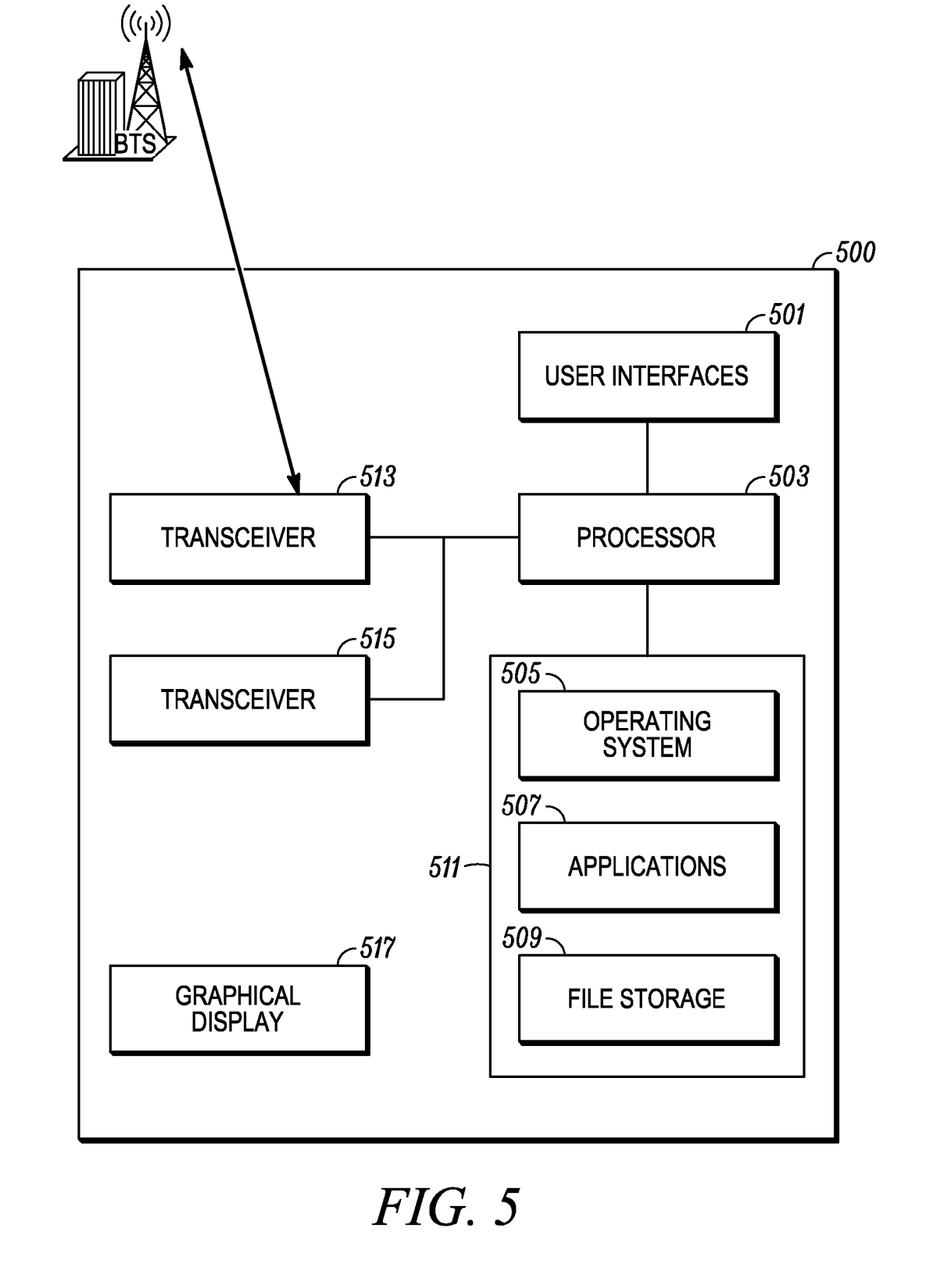
FIG. 5 is a block diagram of a mobile station in accordance with some embodiments.

FIG. 5 is a block diagram illustrating the primary components of a mobile station in accordance with some embodiments. Mobile station 500 comprises user interfaces 501, at least one processor 503, and at least one memory 511. Memory 511 has storage sufficient for the mobile station operating system 505, applications 507 and general file storage 509. Mobile station 500 user interfaces 501, may be a combination of user interfaces including but not limited to a keypad, touch screen, voice activated command input, and gyroscopic cursor controls. Mobile station 500 has a graphical display 517, which may also have a dedicated processor and/or memory, drivers etc. which are not shown in FIG. 5.

It is to be understood that FIG. 5 is for illustrative purposes only and is for illustrating the main components of a mobile station in accordance with the present disclosure, and is not intended to be a complete schematic diagram of the various components and connections therebetween required for a mobile station. Therefore, a mobile station may comprise various other components not shown in FIG. 5 and still be within the scope of the present disclosure.

Returning to FIG. 5, the mobile station 500 also comprises a number of transceivers such as transceivers 513 and 515. Transceivers 513 and 515 may be for communicating with various wireless networks using various standards such as, but not limited to, UMTS, CDMA2000, 802.11, 802.16, etc.

Memory 511 is for illustrative purposes only and may be configured in a variety of ways and still remain within the scope of the present disclosure. For example, memory 511 may be comprised of several elements each coupled to the processor 503. Further, separate processors and memory elements may be dedicated to specific tasks such as rendering graphical images upon a graphical display. In any case, the memory 511 will have at least the functions of providing storage for an operating system 505, applications 507 and general file storage 509 for mobile station 500. In one embodiment, applications 507 comprise a probability test application that is run after receipt of a QI message to determine whether mobile station 500 should join a counting response in accordance with some embodiments as described herein.

Additionally, in some embodiments, applications 507 may comprise a modulation and coding scheme determination application that determines an appropriate modulation and coding scheme for receiving MBMS. Such embodiments are described further below.

Figure 6:
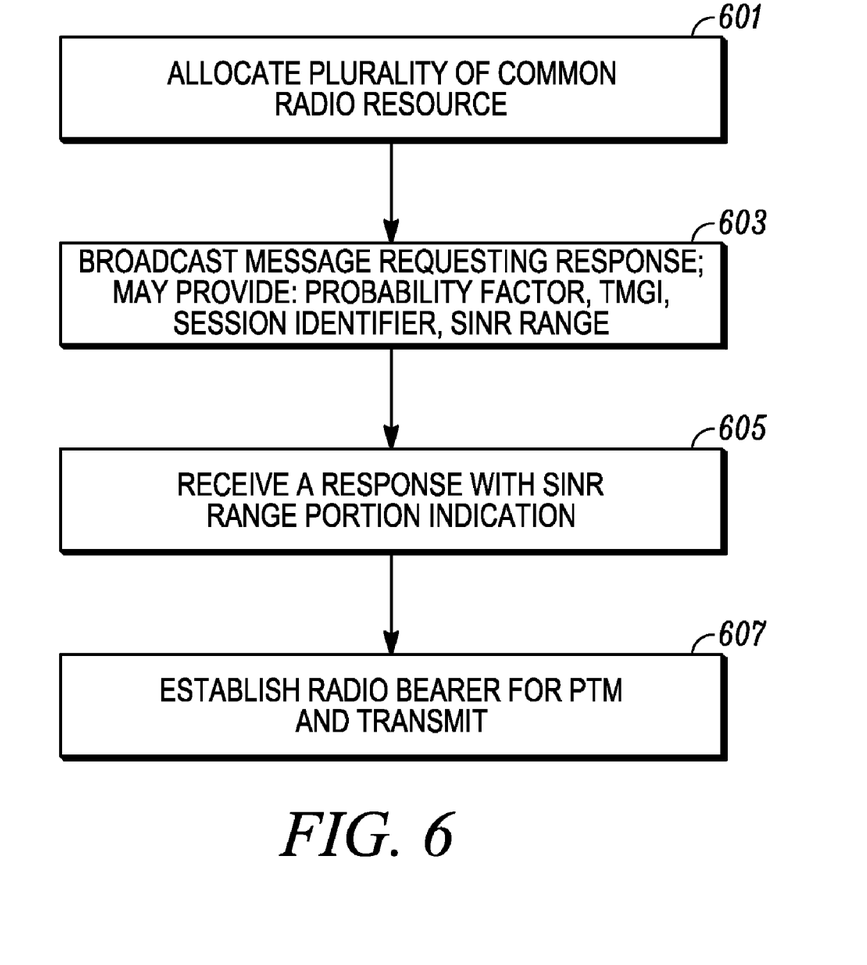
FIG. 6 is a flow chart illustrating a method in accordance with an embodiment.

Turning now to FIG. 6, high level operation of the various embodiments is illustrated. To begin, a base station or base stations 103 allocate a common radio resource as in block 601. The common radio resource may be, for example, one or more OFDM sub-carriers. The base station or base stations 103 broadcast the counting request as shown in block 603. The counting request may include an initial probability factor, TMGI, session identifier, and further in some embodiments a SINR range.

In block 605, at least one counting response is received from a mobile station, or a combined response is received from many mobile stations. The number of responses may be limited by the probability test which each mobile station will run using the provided initial probability factor. The mobile stations may increase this factor upon subsequently received counting requests. Finally, in block 607, the base station will establish a PTM RB and deliver MBMS assuming that a response has been received.

Figure 7:
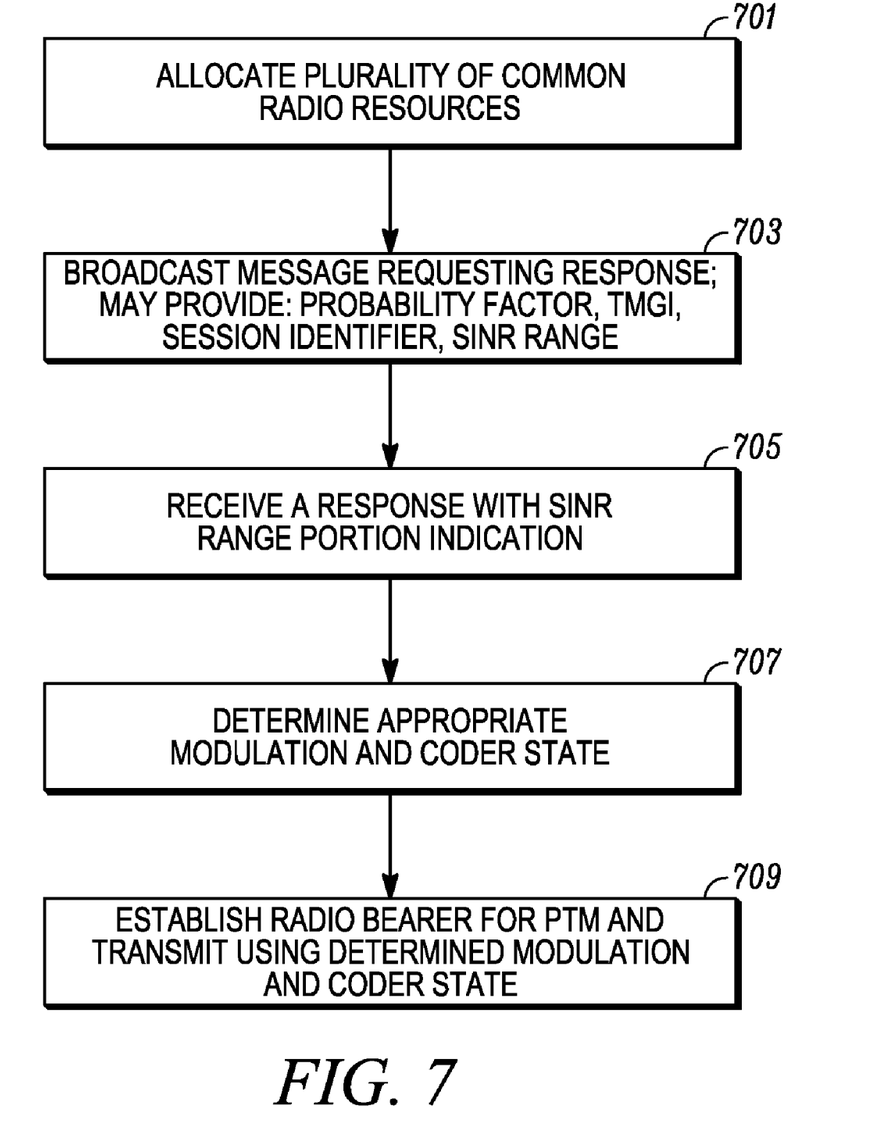
FIG. 7 is a flow chart illustrating further details of a method in accordance with an embodiment.

Turning now to FIG. 7, another embodiment is illustrated wherein blocks 701, 703, and 705 are similar to blocks 601, 603, and 605, respectively. However, in block 705, the received response may indicate a modulation and coding scheme (MCS) achievable by the mobile stations. In some embodiments, the base station will ask for an achievable MCS state in block 703, and receive an MCS selection indication as part of the response in block 705. The MCS may be for example, rate ⅓ turbo coding used with one of Quadrature Phase Shift Keying (QPSK), Quadrature Amplitude Modulation (QAM) such as 4, 8, 16, or 64-QAM. The MCS in general may be any other suitable modulation and coding scheme. Furthermore, the indication of MCS state may alternatively comprise an indication of SINR that corresponds to an MCS that could be used by the base station transmitter and that the mobile station could receive at an acceptable error rate.

In a different embodiment, the response of block 705 provides indication that the mobile stations are within the SINR range provided in block 703, such that the base station may select an appropriate MCS as shown in block 707. In block 709, a PTM RB is established assuming that at least one response was received, and the determined MCS is used for MBMS delivery.

By employing the various embodiments of the present disclosure, reverse link signaling overhead is reduced because the various embodiments utilize a physical layer signaling approach rather than using messaging, such that less information is transmitted. Further, because power transmitted from mobile stations responding to a counting is combined in the various embodiments, reliability is increased. Still further, the various embodiments reduce delay, because the physical layer in the base station may control counting, rather than higher layers in the base station controller.

In another embodiment, a modulation and coder state (MCS) may be selected for delivery of MBMS. In Enhanced MBMS delivery (E-MBMS), very high signal-to-noise-and-interference ratios (SINR) may occur when many cells transmit in a single frequency network while low SINR may occur when only one cell transmits. Because the best efficiency is achieved by selecting proper MCS states as quickly as possible, some embodiments make this selection prior to beginning transmission, during the counting process.

Therefore, in some embodiments the base station 103 may provide a SINR range such that only mobile stations having a SINR for signal reception that is within the range would join the counting. Other procedures, such as the probability test may still be used in conjunction with the SINR range requirement. In an alternative embodiment, the base station may request the mobile station to answer directly whether a given MCS is achievable; otherwise a mobile station may respond if it conforms to the SINR range and any other requirement such as the probability test.

In some embodiments, a mobile station may reply with one bit indicating that it is within the SINR range. However, multiple bits may be transmitted to indicate channel conditions or a preferred MCS for the mobile station. Using additional bits, as in some embodiments, is helpful for indicating for example, where in a range the mobile station falls, assuming a large constraint range.

Various approaches for SINR measurement by a mobile station may be used and remain within the scope of the present disclosure. For example, the serving base station may indicate to the mobile stations which base stations will transmit, similar to a neighbor list, such that a mobile station may estimate SINR by measuring the pilot channels from each of the indicated base stations. Alternatively, the network may transmit a single pilot from all base stations that will deliver the service, such that a mobile station may determine the SINR from the combined pilot channel.

While the preferred embodiments have been illustrated and described, it is to be understood that the disclosure is not so limited. Numerous modifications, changes, variations, substitutions and equivalents will occur to those skilled in the art without departing from the spirit and scope of the present invention as defined by the appended claims.

What is claimed is:

1. A method of operating a wireless communication network infrastructure entity comprising:
   allocating a plurality of common radio resources for receiving responses from a plurality of mobile stations in a coverage area, wherein said radio resources are frequency and time based resources;
   broadcasting a message requesting said responses, said message indicating a signal-to-noise-and-interference ratio range;
   receiving responses from said plurality of mobile stations wherein different specific resources comprising said plurality of common radio resources correspond to different portions of said signal-to-noise-and-interference ratio range wherein a particular mobile station of said plurality of mobile stations may respond using said specific resource corresponding to a portion of said signal-to-noise-and-interference ratio range received by said particular mobile station; and
   transmitting data in a Point-to-Multipoint transmission mode if said response is received from at least one mobile station of said plurality of mobile stations.

2. The method of claim 1, wherein the step of broadcasting a message requesting said responses, further comprises:
   providing a physical layer indicator through which a Temporary Mobile Group Identity (TMGI) and a probability factor may be determined by said at least one mobile station.

3. The method of claim 1, wherein the step of broadcasting a message requesting said responses, further comprises:
   transmitting a physical layer indicator notifying said plurality of mobile stations to cease transmitting said responses.

4. The method of claim 1, further comprising:
   determining a modulation and coding scheme based on at least one received response; and
   wherein the step of transmitting data in a Point-to-Multipoint transmission mode further comprises using said modulation and coding scheme.

5. The method of claim 1, further comprising:
   receiving a combined response from a subset of said plurality of mobile stations on a specific resource of said plurality of common radio resources wherein said combined response indicates a specific portion of said signal-to-noise-and-interference ratio range.

6. The method of claim 5, wherein the step of broadcasting a message requesting said responses further comprises:
   indicating a probability factor within said message.

7. The method of claim 6, wherein the step of broadcasting a message requesting said responses, further comprises:
   requesting said response only from mobile stations having said specified signal-to-noise-and-interference ratio range for received signals.

8. The method of claim 6, wherein the step of broadcasting a message requesting said responses, further comprises:

requesting said responses from mobile stations having said specified signal-to-noise-and-interference ratio range for received signals and meeting a probability criteria determined by said mobile stations using said probability factor.

9. A base station comprising:
a transceiver; and
a controller coupled to said transceiver, configured to:
allocate a plurality of common radio resources for receiving responses from a plurality of mobile stations, within a coverage area of said transceiver, responding to a request message broadcast by said transceiver, wherein said radio resources are frequency and time based resources;
indicate a signal-to-noise-and-interference ratio range;
receive responses from said plurality of mobile stations wherein different specific resources comprising said plurality of common radio resources correspond to different portions of said signal-to-noise-and-interference ratio range wherein a particular mobile station of said plurality of mobile stations may respond using said specific resource corresponding to a portion of said signal-to-noise-and-interference ratio range received by said particular mobile station; and
transmit data in a Point-to-Multipoint mode.

10. The base station of claim 9, wherein said transceiver and said controller are further configured to:
determine a modulation and coding scheme based on at least one received response; and
transmit data in a Point-to-Multipoint transmission mode using said modulation and coding scheme.

11. The base station of claim 9, wherein said transceiver is configured to receive a combined response from a subset of said plurality of mobile stations on a specific resource of said plurality of common radio resources wherein said combined response indicates a specific portion of said signal-to-noise-and-interference ratio range.

12. The base station of claim 11, wherein said controller is further configured to select a modulation and coding scheme for transmitting data in a Point-to-Multipoint mode based upon said at least one response to said request message.

13. The base station of claim 11, wherein said controller is further configured to select a modulation and coding scheme for transmitting data in a Point-to-Multipoint mode based upon at least one response indicating said specific portion of said signal-to-noise-and-interference ratio range.

14. The base station of claim 9, wherein said controller is further configured to broadcast a probability factor in said request message.

15. A mobile station comprising:
a transceiver; and
a controller coupled to said transceiver, configured to utilize a plurality of modulation and coding schemes and further configured to:
receive a request message specifying a signal-to-noise-and-interference ratio range for received signals and indicating a set of allocated resources wherein a particular resource of the set corresponds to a sub-range of said signal-to-noise-and-interference ratio range, wherein said allocated resources are frequency and time based radio resources;
determine whether a signal-to-noise-and-interference ratio for signals received by said transceiver is within said signal-to-noise-and-interference ratio range; and
transmit an indicator using one allocated resource, selected from said set of allocated resources, wherein said one allocated resource corresponds to a sub-range of said signal-to-noise-and-interference ratio range which contains said signal-to-noise-and-interference ratio for signals received by said transceiver.

16. The mobile station of claim 15, wherein said controller is further configured to:
select a modulation and coding scheme, from said plurality of modulation and coding schemes, for receiving data based on said signal-to-noise-and-interference ratio for signals received by said transceiver; and
transmit an indicator requesting said modulation and coding scheme.

17. The mobile station of claim 16, wherein said plurality of modulation and coding schemes comprises Quadrature Phase Shift Keying (QPSK) with a forward error correction code, and Quadrature Amplitude Modulation (QAM) with a forward error correction code including 16-QAM with a forward error correction code, and 64-QAM with a forward error correction code.

18. The mobile station of claim 15, wherein said controller is further configured to:
receive a service identity indicator for a service that may be transmitted in a Point to Multipoint transmission mode.

19. The mobile station of claim 15, wherein said controller is further configured to:
receive a physical layer indicator and determine a Temporary Mobile Group Identity (TMGI) and a probability factor therefrom.

20. The mobile station of claim 19, wherein said controller is further configured to:
receive a physical layer indicator to cease transmission using said set of allocated resources.

* * * * *